(12) United States Patent
Fujio et al.

(10) Patent No.: US 10,124,728 B2
(45) Date of Patent: Nov. 13, 2018

(54) IMAGE PROCESSING APPARATUS

(71) Applicant: FUJITSU TEN LIMITED, Kobe-shi, Hyogo (JP)

(72) Inventors: Akihide Fujio, Kobe (JP); Koichi Yamamoto, Kobe (JP); Azusa Minode, Kobe (JP); Yasushi Seike, Kobe (JP); Minoru Yoshimura, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 197 days.

(21) Appl. No.: 14/851,772

(22) Filed: Sep. 11, 2015

(65) Prior Publication Data
US 2016/0094807 A1    Mar. 31, 2016

(30) Foreign Application Priority Data

Sep. 26, 2014   (JP) .................. 2014-196029

(51) Int. Cl.
*B60R 1/00*      (2006.01)
*B62D 15/02*    (2006.01)
*H04N 7/18*      (2006.01)

(52) U.S. Cl.
CPC ............ B60R 1/00 (2013.01); B62D 15/0275 (2013.01); B62D 15/0295 (2013.01); H04N 7/183 (2013.01); *B60R 2300/8086* (2013.01)

(58) Field of Classification Search
CPC ............................. B60R 1/00; B62D 15/0275
See application file for complete search history.

(56) References Cited

U.S. PATENT DOCUMENTS

| | | | | |
|---|---|---|---|---|
| 6,411,867 B1* | 6/2002 | Sakiyama | ............... | B60Q 9/005 340/901 |
| 6,898,495 B2* | 5/2005 | Tanaka | .................. | B60Q 9/005 348/116 |
| 7,366,595 B1* | 4/2008 | Shimizu | ................. | B60K 35/00 340/937 |
| 8,930,140 B2* | 1/2015 | Trombley | .............. | G01C 21/20 348/148 |
| 9,598,106 B2* | 3/2017 | Sobue | ................ | B62D 15/0275 |
| 2014/0368636 A1* | 12/2014 | Lee | .................... | B62D 15/0285 348/118 |

FOREIGN PATENT DOCUMENTS

JP    2000078566 A    *  3/2000   ......... B62D 15/0275
JP    2011-180405 A       9/2011

* cited by examiner

*Primary Examiner* — James M Pontius
*Assistant Examiner* — Kyle M Lotfi
(74) *Attorney, Agent, or Firm* — Oliff PLC

(57) ABSTRACT

An image processing apparatus that processes an image includes an image processor configured to: acquire a photographic image from a camera photographing a region near a host vehicle; derive a trace line showing a moving trace of a path on which the host vehicle has moved previously; derive a prediction line showing a predicted moving path of the host vehicle; generate a support image by superimposing the trace line and the prediction line on the photographic image when a wheel of the host vehicle is turned; and output the support image to a display apparatus that displays the support image.

11 Claims, 13 Drawing Sheets

IMAGE PROCESSING APPARATUS

BACKGROUND OF THE INVENTION

Field of the Invention

The invention relates to the technology for image processing.

Description of the Background Art

Conventionally, an image display system which displays a surrounding image of a vehicle, etc. is proposed. The image display system displays a guiding line to support an operation for parking a vehicle within a parking frame by reversing the vehicle.

In the conventional technology, the guiding line is displayed and let a driver confirm a width and a traveling direction of a host vehicle. In a case where the driver turns a wheel to an opposite traveling direction to adjust a parking position, it is difficult to confirm a difference of the traveling direction of the host vehicle before and after turning the wheel. The driver needs to adjust the parking position again if the traveling direction of the host vehicle after turning the wheel is same as the traveling direction of the host vehicle before turning the wheel. However, there is a possibility that the driver moves the host vehicle to the same position after turning the wheel unless the difference of the traveling direction before and after turning the wheel is clarified.

SUMMARY OF THE INVENTION

According to one aspect of the invention, an image processing apparatus that processes an image includes an image processor configured to: acquire a photographic image from a camera photographing a region near a host vehicle; derive a trace line showing a moving trace of a path on which the host vehicle has moved previously; derive a prediction line showing a predicted moving path of the host vehicle; generate a support image by superimposing the trace line and the prediction line on the photographic image when a wheel of the host vehicle is turned; and output the support image to a display apparatus that displays the support image.

Thus, the support image is generated by superimposing the trace line and the prediction line on the photographic image when the wheel of the host vehicle is turned to the opposite traveling direction and the generated support image is displayed on the display apparatus. Therefore, a user can grasps a difference of the traveling direction before and after turning the wheel.

Moreover, according to another aspect of the invention, the image processor is configured to acquire information as to a shift position of the host vehicle, and the image processor determines whether the wheel of the host vehicle has turned when the shift position changes between a position showing a forward movement of the host vehicle and a position showing a backward movement of the host vehicle.

Thus, the host vehicle repeats the forward movement and the backward movement alternately when the wheel of the host vehicle is turned to the opposite traveling direction. Therefore, it can be determined whether turning the wheel is carried out or not based on a change of the shift position.

Hence, an object of the invention is to provide a technology for specifying the difference of the traveling direction before and after turning a wheel by displaying the traveling direction of the host vehicle before and after turning the wheel.

These and other objects, features, aspects and advantages of the invention will become more apparent from the following detailed description of the invention when taken in conjunction with the accompanying drawings.

DESCRIPTION OF THE EMBODIMENTS

Hereinafter, some embodiments of the invention are described with reference to the drawings.

1. First Embodiment

<1-1. System Configuration>

Figure 1:
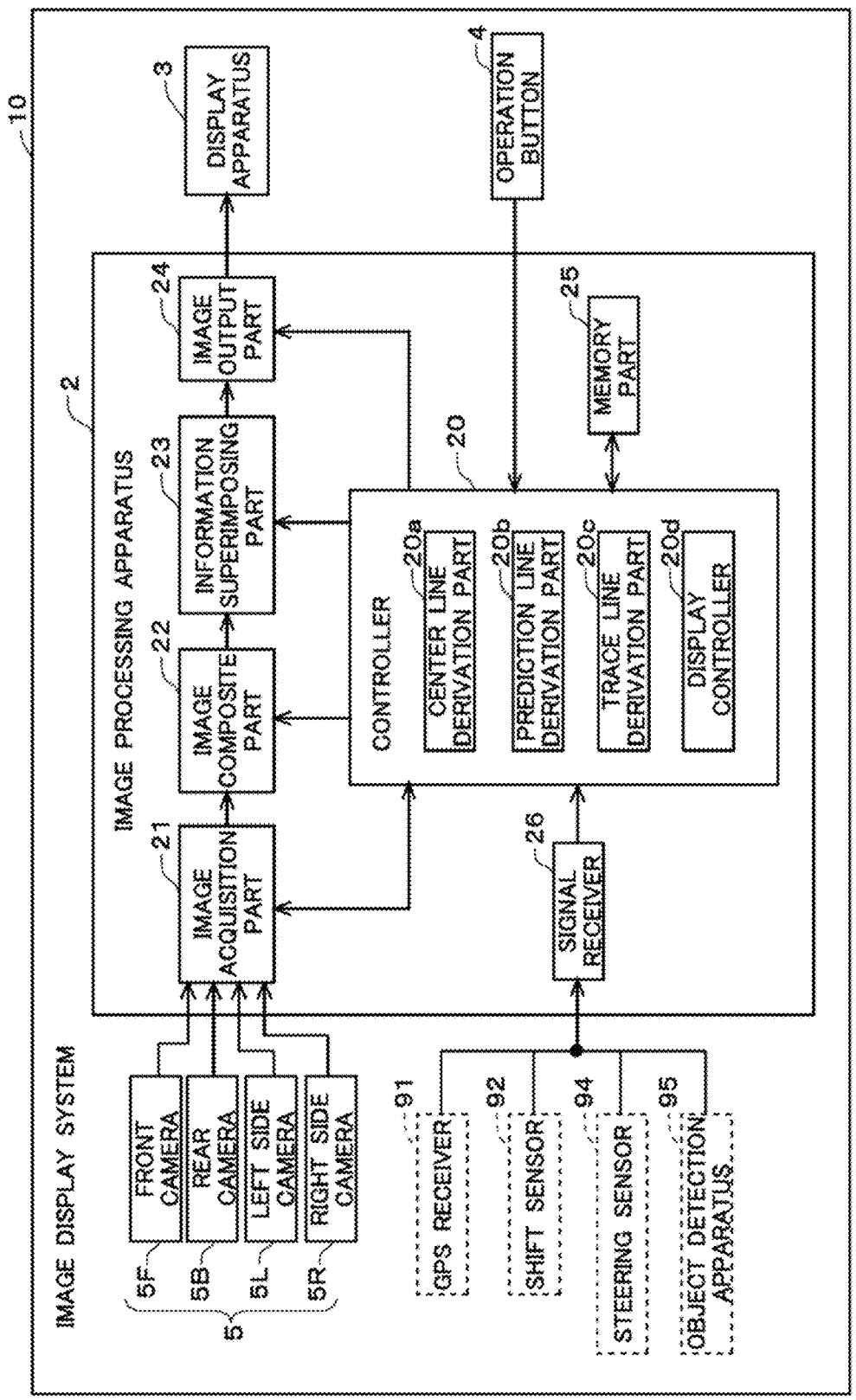
FIG. 1 illustrates an outline of an image display system.

FIG. 1 illustrates a schematic block diagram showing a configuration of an image display system 10 in a first embodiment. The image display system 10 is used for a vehicle (a car, in this embodiment). The image display system 10 generates an image showing a region near the vehicle and includes a function of displaying the image in the vehicle cabin. A user of the image display system 10 (typically a driver) can grasp a surrounding situation of the vehicle almost in real time by using the image display system 10. Hereinafter, the vehicle on which the image display system 10 is mounted is referred to as "host vehicle".

As FIG. 1 shows, the image display system 10 includes plural cameras 5, an image processing apparatus 2, a display apparatus 3, and an operation button 4. The plural cameras 5 photograph a region near a host vehicle and acquires photographic images. The plural cameras 5 input the acquired photographic images to the image processing apparatus 2. The image processing apparatus 2 generates a support image to be displayed on the display apparatus 3 by using the photographic images showing the region near the host vehicle. The display apparatus 3 displays the support image generated by the image processing apparatus 2. The operation button 4 receives a user's operation.

The plural cameras 5 include lenses and imaging devices. The plural cameras 5 electronically acquire the photographic images showing the region near the host vehicle. The plural cameras 5 include a front camera 5F, a rear camera 5B, a left side camera 5L and a right side camera 5R. These four cameras, 5F, 5B, 5L, 5R, are arranged in each different position in a host vehicle 9 and photograph a region near the host vehicle in a different direction.

Figure 2:
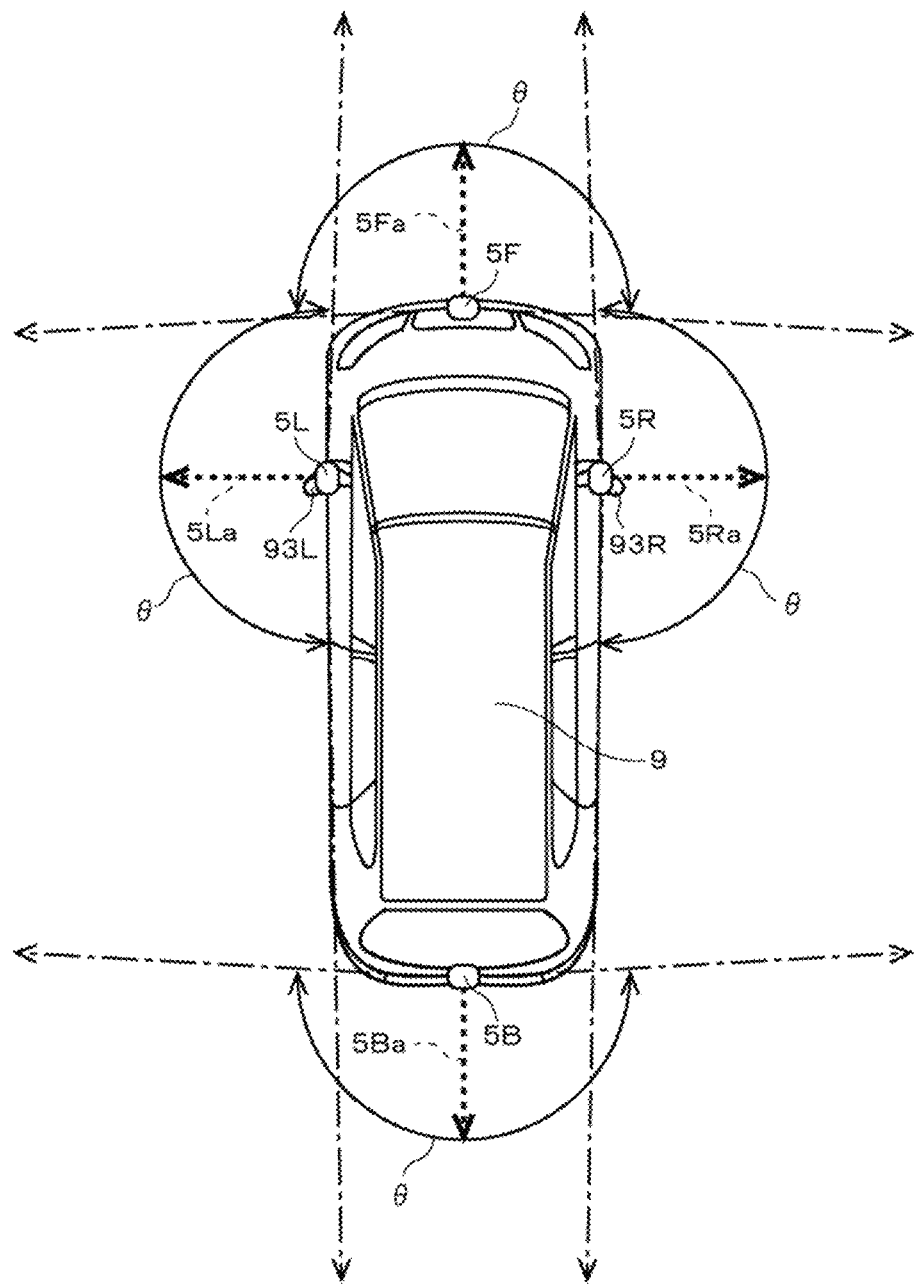
FIG. 2 illustrates a photographing direction of four cameras.

FIG. 2 illustrates each photographing direction of the four cameras 5F, 5B, 5L, and 5R. The front camera 5F is arranged on a front end of the host vehicle 9, having an optical axis 5Fa extending in a straight direction of the host vehicle 9. The rear camera 5B is arranged on a rear end of the host vehicle 9, having an optical axis 5Ba extending in a direction opposite to the straight direction of the host vehicle 9. The left side camera 5L is arranged on a left side mirror 93L, having an optical axis 5La extending in a leftward direction of the host vehicle 9 (an orthogonal direction to a straight direction). The right side camera 5R is arranged on a right side mirror 93R, having an optical axis 5Ra extending in a rightward direction of the host vehicle 9 (an orthogonal direction to the straight direction).

The cameras 5F, 5B, 5L, and 5R include a wide lens such as a fisheye lens. The cameras 5F, 5B, 5L, and 5R include more than 180 degrees angle of view θ. The cameras 5F, 5B, 5L, and 5R can photograph all around the host vehicle 9 by using these four cameras together.

FIG. 1 is referred. The display apparatus 3 includes a flat display panel such as a liquid crystal. The display apparatus 3 displays various kinds of information and images. The display apparatus 3 is arranged in a position where the user can see the display such as an instrument panel of the host vehicle 9. The display apparatus 3 is arranged in a same housing with the image processing apparatus 2 and may be unified with the image processing apparatus 2. However, the display apparatus 3 may remain as a separate apparatus from the image processing apparatus 2.

The operation button 4 is an operation member that receives the user's operation. The operation button 4, for example, is arranged on a steering wheel of the host vehicle 9 and mainly receives the user's operation. A touch panel of the display apparatus 3 can be used as the operation button 4. The user performs various operations to the image display system 10 through this operation button 4 or the touch panel of the display apparatus 3. In a case where the user's operation is carried out to the operation button 4, an operation signal showing an operation content is input to the image processing apparatus 2.

The image processing apparatus 2 is an electronic apparatus capable of processing various kinds of images. The image processing apparatus 2 includes an image acquisition part 21, an image composite part 22, an information superimposing part 23, and an image output part 24.

The image acquisition part 21 acquires photographic images acquired by the four cameras 5F, 5B, 5L, and 5R. The image, acquisition part 21 includes an image processing function which converts an analog photographic image into a digital photographic image. The image acquisition part 21 performs a predetermined image process to the acquired photographic images and inputs the photographic images to the image composite part 22 after performing the process.

The image composite part 22 is a hardware circuit that performs an image processing to generate a composite image. The image composite part 22 composes plural photographic images acquired by the plural cameras 5 and generates the composite image showing the region near the host vehicle 9 viewing from a virtual viewpoint. The image composite part 22 projects plural photographic images onto a virtual projection plane which is equivalent to the region near the host vehicle 9 and generates the composite image by use of data in the projection plane. A well-known technique may be used for generating the composite image.

The information superimposing part 23 superimposes various kinds of information necessary for the user on the photographic images acquired by the image acquisition part 21 from each of the camera 5 or the composite image generated by the image composite part 22. Concretely, the information superimposing part 23 generates a support image by superimposing support information for parking (hereinafter referred to as "support information") on the photographic images or the composite image when parking the host vehicle 9. The support information, for example, is a center line, a prediction line, and a trace line. The center line is a line showing an approximate center in a parking region. The prediction line is a line predicting a path on which the host vehicle 9 will move in the future (a moving prediction line). The trace line is a line showing a trace on which the host vehicle 9 has moved in the past (a moving trace line). Details of a technique for generating the support image will be described later.

The image output part 24 outputs the support image generated by the information superimposing part 23 to the display apparatus 3 and displays the support image on the display apparatus 3. Thus, an image showing a front portion or a rear portion of the host vehicle 9 or an image showing the region near the host vehicle 9 viewing from the virtual viewpoint are displayed on the display apparatus 3.

The image processing apparatus 2 further includes a controller 20, a memory part 25, and a signal receiver 26. The controller 20 is a microcomputer including a CPU, a RAM, and a ROM. The controller 20 integrally controls the entire image processing apparatus 2.

The memory part 25 is a non-volatile memory such as a flash memory. The memory part 25 stores various kinds of information. The memory part 25 stores a program as firmware, or various kinds of data used by the information superimposing part 23 for the generation of support images, or various kinds of data used by the image composite part 22 for the generation of composite images, etc. Data used for the generation of support images, for example, is the data showing the moving trace of the host vehicle 9.

The signal receiver 26 receives a signal from different apparatus from the image processing apparatus 2 arranged in the host vehicle 9 and inputs the signal to the controller 20. The different apparatus, for example, are a GPS (Global Positioning System) receiver 91, a shift sensor 92, a steering sensor 94, an object detection apparatus 95 and the like.

The signal receiver 26 receives a signal showing positional information of the host vehicle 9 which is derived based on a signal received from a GPS satellite from the GPS receiver 91. The signal receiver 26 receives a signal showing a shift position (a gear position) which indicates a shift lever position of a transmission apparatus of the host vehicle 9 from the shift sensor 92. The signal receiver 26 receives a signal showing a rotation direction and rotation angle of the steering of the host vehicle 9 from the steering sensor 94. The signal receiver 26 receives a signal concerning a detection result of objects existing near the host vehicle 9 from the object detection apparatus 95.

Various functions of the controller 20 are implemented by a performance of arithmetic processing of the CPU based on programs stored in the memory part 25. A center line derivation part 20a, a prediction line derivation part 20b, a trace line derivation part 20c, and a display controller 20d shown in FIG. 1 are implemented by the performance of arithmetic processing of the CPU based on the programs.

The center line derivation part 20a recognizes a region where the host vehicle 9 can be parked and derives the approximate center part of the available parking region. The center line derivation part 20a derives a center line showing the approximate center part of the available parking region. The prediction line derivation part 20b predicts the moving path of the host vehicle 9 and derives a prediction line showing the predicted moving path. The trace line derivation part 20c derives the moving trace of the host vehicle 9 and derives a trace line showing the trace on which the host vehicle 9 has moved. The display controller 20d makes the image output part 24 output the support image which should be displayed to the display apparatus 3. Details on a process of function parts 20a, 20b, 20c, and 20d which is implemented by the controller 20 will be described later.

<1-2. Generation and Display of Support Image>

Figure 3:
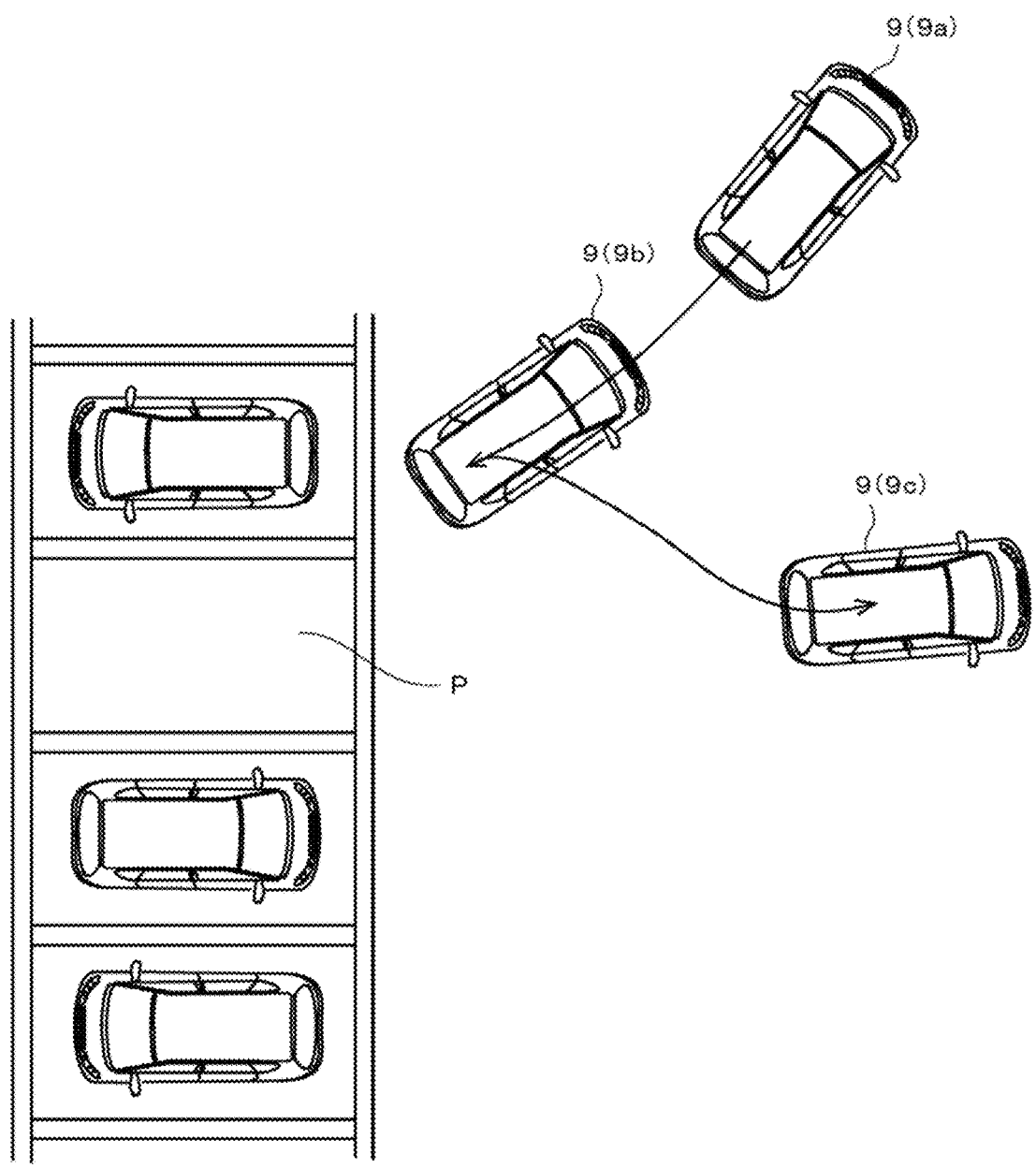
FIG. 3 explains a situation of generating a support image.

With use of FIGS. 3, 4, 5, and 6, an explanation about a process of generating a support image and a process of displaying the support image is given. FIG. 3 illustrates a situation in which a host vehicle 9 is being parked in an available parking region P. In this embodiment, an example of parking the host vehicle 9 by moving backward (so-called backing up) is explained. Concretely, in the example, after moving the host vehicle 9 from a position 9a to a position 9b, a wheel of the host vehicle 9 is turned to move to a position 9c, and again the wheel of the host vehicle 9 is turned to park. In case of turning the wheel at the position 9b, from the position 9a to the position 9b is a movement before turning the wheel. From the position 9b to the position 9c is a movement after turning the wheel. In case of turning the wheel at the position 9c, from the position 9b to the position 9c is a movement before turning the wheel. A movement from the position 9c is a movement after turning the wheel.

Figure 4:
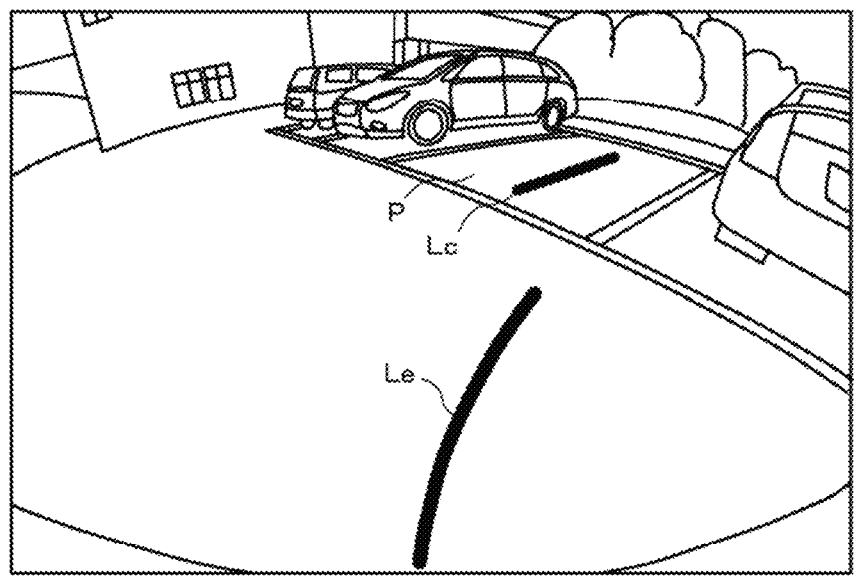
FIG. 4 illustrates, an example of a support image.
Figure 5:
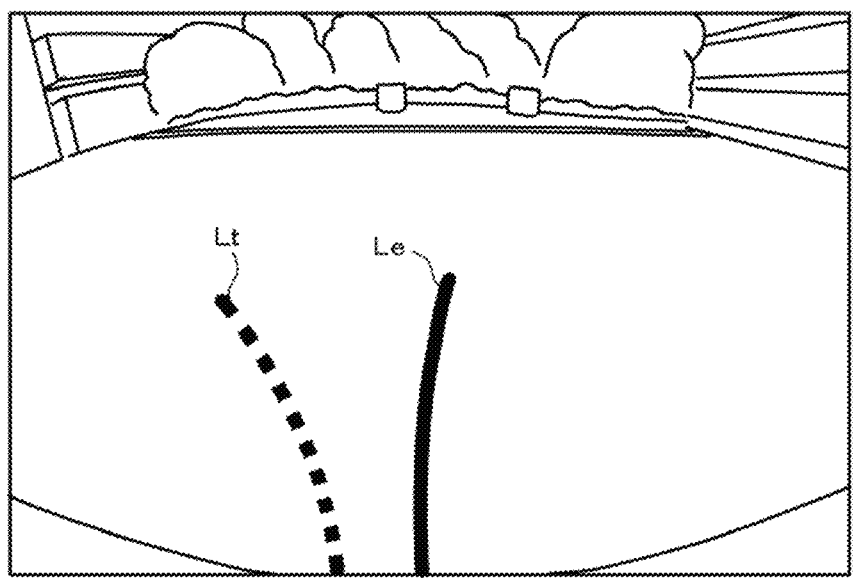
FIG. 5 illustrates an example of a support image.
Figure 6:
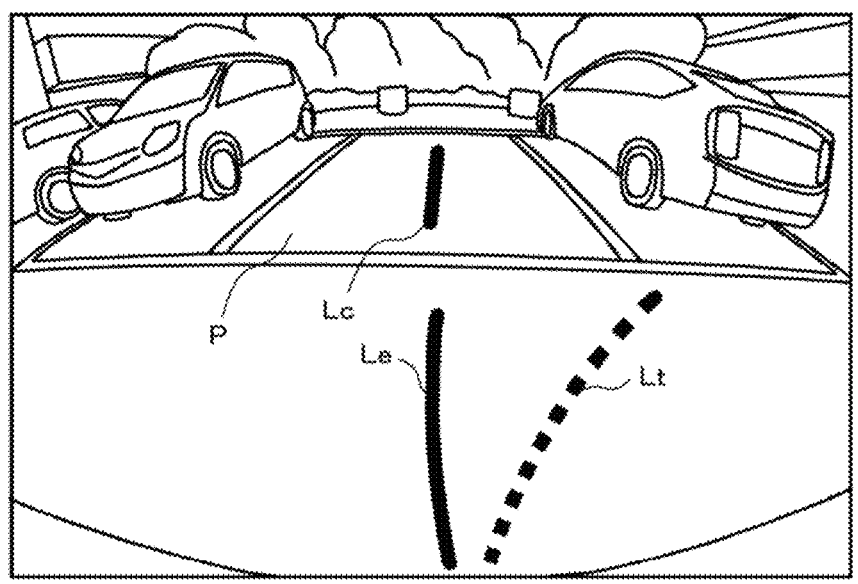
FIG. 6 illustrates an example of a support image.

FIGS. 4, 5, and 6 illustrate examples of support images generated by use of photographic images acquired by a rear camera 5B or a front camera 5F. FIG. 4 is a support image which is displayed while the host vehicle 9 moves from the position 9a. This support image is the image superimposing a center line Lc and a prediction line Le on the photographic image acquired by the rear camera 5B. FIG. 5 is a support image which is displayed while the host vehicle 9 moves from the position 9b. This support image is the image superimposing a prediction line Le and a trace line Lt on the photographic image acquired by the front camera 5F. FIG. 6 is a support image which is displayed while the host vehicle 9 moves from the position 9c. This support image is the image superimposing a center line Lc, a prediction line Le, and a trace line Lt on the photographic image acquired by the rear camera 5B.

The center line Lc is the line showing an approximate center part of the available parking region P. The center line Lc extends in a front-back direction (hereinafter referred to as "parking direction") when the host vehicle 9 is parked in the available parking region P. The prediction line Le is the line showing a predicted moving path of the host vehicle 9. The trace line Lt is the line showing a trace on which the host vehicle 9 has moved before turning the wheel if the wheel of the host vehicle 9 has turned. In other words, it is possible to park the host vehicle 9 in the approximate center of the available parking region P by moving the host vehicle 9 in a way that the prediction line Le overlaps the center line Lc. Moreover, it is avoidable to move the host vehicle 9 back to the position before turning the wheel by moving the host vehicle 9 in a way that the prediction line Le does not overlap the trace line Lt.

A process of generating a support image is explained. When the host vehicle 9 tries to start parking from the position 9a, the center line derivation part 20a recognizes the available parking region P based on the photographic image acquired by the image acquisition part 21 from the rear camera 5B. The available parking region P is recognized based on a white line in the photographic image or an object and available space in the photographic image. In addition, the available parking region P may be recognized based on an object and available space using information acquired by an object detection apparatus 95.

The center line derivation part 20a derives a center line of the recognized available parking region P. In other words, the center line derivation part 20a generates a line extending in a parking direction over the approximate center part of the available parking region P.

The prediction line derivation part 20b derives a prediction line showing a predicted moving path of the host vehicle 9. Concretely, the prediction line derivation part 20b generates a line extending along the predicted moving path from a center part of the host vehicle 9. A prediction of the moving path, for example, is made based on information of a rotation direction and rotation angle of a steering acquired by a steering sensor 94.

The information superimposing part 23 generates a support image like the support image illustrated in FIG. 4 by superimposing and displaying the center line Lc and the prediction line Le on a photographic image photographed by the rear camera 5B. The display controller 20d makes the image output part 24 output the generated support image to the display apparatus 3. The display apparatus 3 displays this support image.

When the host vehicle 9 moves from the position 9a to the position 9b, the host vehicle 9 stores information of the path on which the host vehicle 9 has moved from the position 9a (that is, a moving trace). Information about this moving path may be derived, for example, based on information acquired from a GPS receiver 91. Moreover, the information about this moving path may be derived based on plural image information acquired at different timings.

When the host vehicle 9 tries to move to the position 9c by turning the wheel at the position 9b, the trace line derivation part 20c derives a trace line based on the information of the moving path from the position 9a to the position 9b. In other words, the trace line derivation part 20c generates a trace line before turning the wheel by connecting the path on which the host vehicle 9 has moved before turning the wheel.

The prediction line derivation part 20b derives a prediction line predicting a path of the host vehicle 9 in moving from the position 9b. In other words, the prediction line derivation part 20b generates a line extending along the predicted path from the center part of the host vehicle 9. The prediction of this moving path is made, similarly as described above, based on the information of the rotation direction and rotation angle of the steering acquired by the steering sensor 94.

The information superimposing part 23 generates a support image like the support image illustrated in FIG. 5 by superimposing and displaying a prediction line Le and a trace line Lt on a photographic image photographed by the front camera 5F. The display controller 20d makes the image output part 24 output the generated support image to the display apparatus 3. The display apparatus 3 displays this support image.

When the host vehicle 9 moves from the position 9b to the position 9c, the host vehicle 9 stores information of the moving path from the position 9*b* (that is, a moving trace). The information about this moving path is derived similarly as described above. When the wheel of the host vehicle 9 is turned at the position 9*c* to move further toward the available parking region P, the trace line derivation part 20*c* derives a trace line based on the information of the moving path from the position 9*b* to the position 9*c*. In other words, the trace derivation part 20*c* generates a trace line before turning the wheel by connecting the moving path before turning the wheel.

The center line derivation part 20*a* recognizes the available parking region P and derives a center line of the available parking region P. In other words, the center line derivation part 20*a* generates a line extending in the parking direction over the approximate center part of the available parking region P. The prediction line derivation part 20*b* derives a prediction line predicting a path of the host vehicle 9 in moving from the position 9*c*. In other words, the prediction line derivation part 20*b* generates a line extending along the predicted path from the center part of the host vehicle 9. The prediction of this moving path is made similarly as described above.

The information superimposing part 23 generates a support image like the support image illustrated in FIG. 6 by superimposing and displaying the center line Lc, the prediction line Le, and the trace line Lt on a photographic image photographed by the rear camera 5B. The display controller 20*d* makes the image output part 24 output the generated support image to the display apparatus 3. The display apparatus 3 displays this support image.

Even in a case where the wheel of the host vehicle has turned in parking in a parking lot, etc., a trace line of the host vehicle before turning the wheel and a prediction line after the turning the wheel are displayed. Hence, a difference of the traveling direction of the host vehicle before and after turning the wheel can be specified. By displaying the center line of the available parking region, it is possible to support the host vehicle to park in the approximate center of the available parking region.

<1-3. System Processing>

Figure 7:
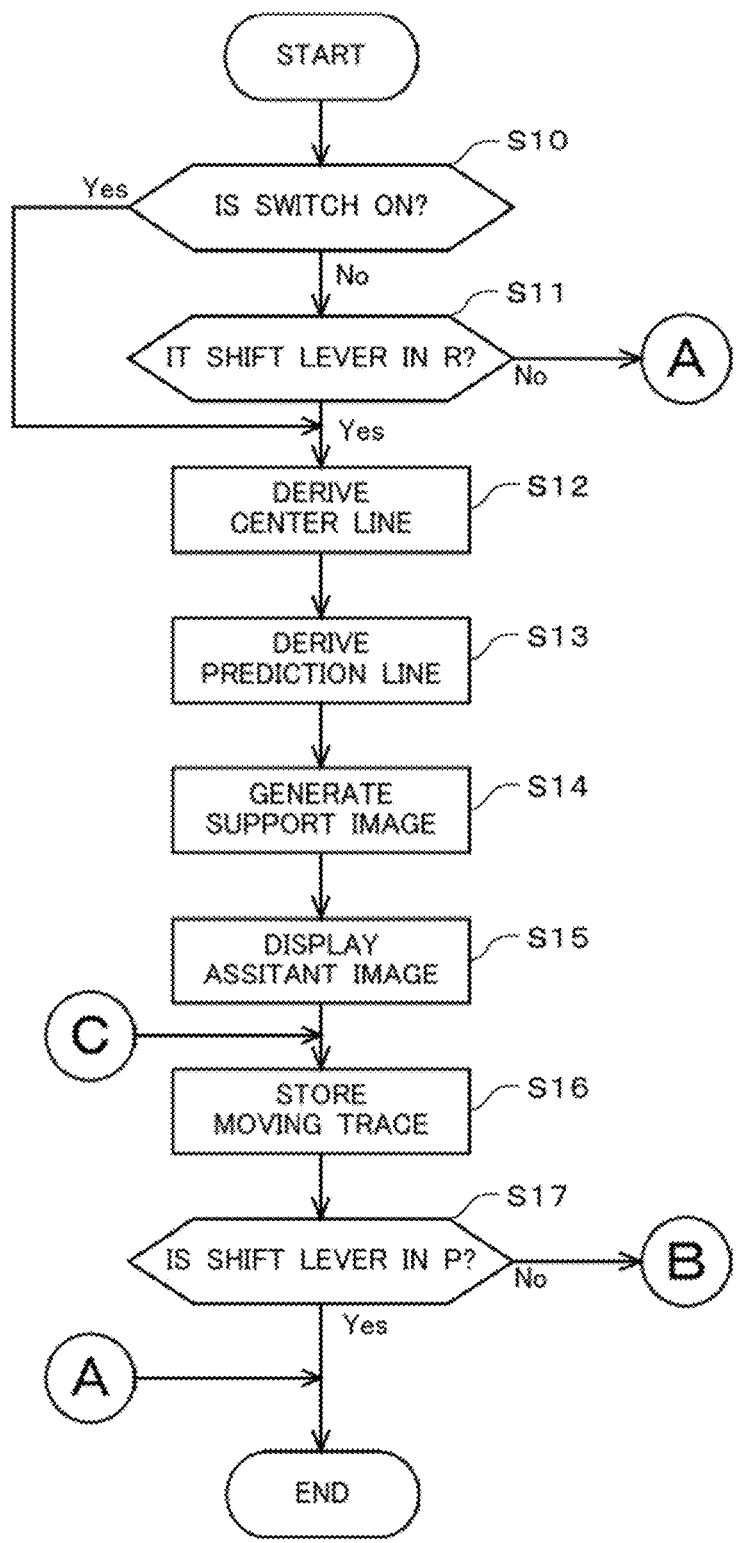
FIG. 7 illustrates a flowchart showing a process of the image display system.
Figure 8:
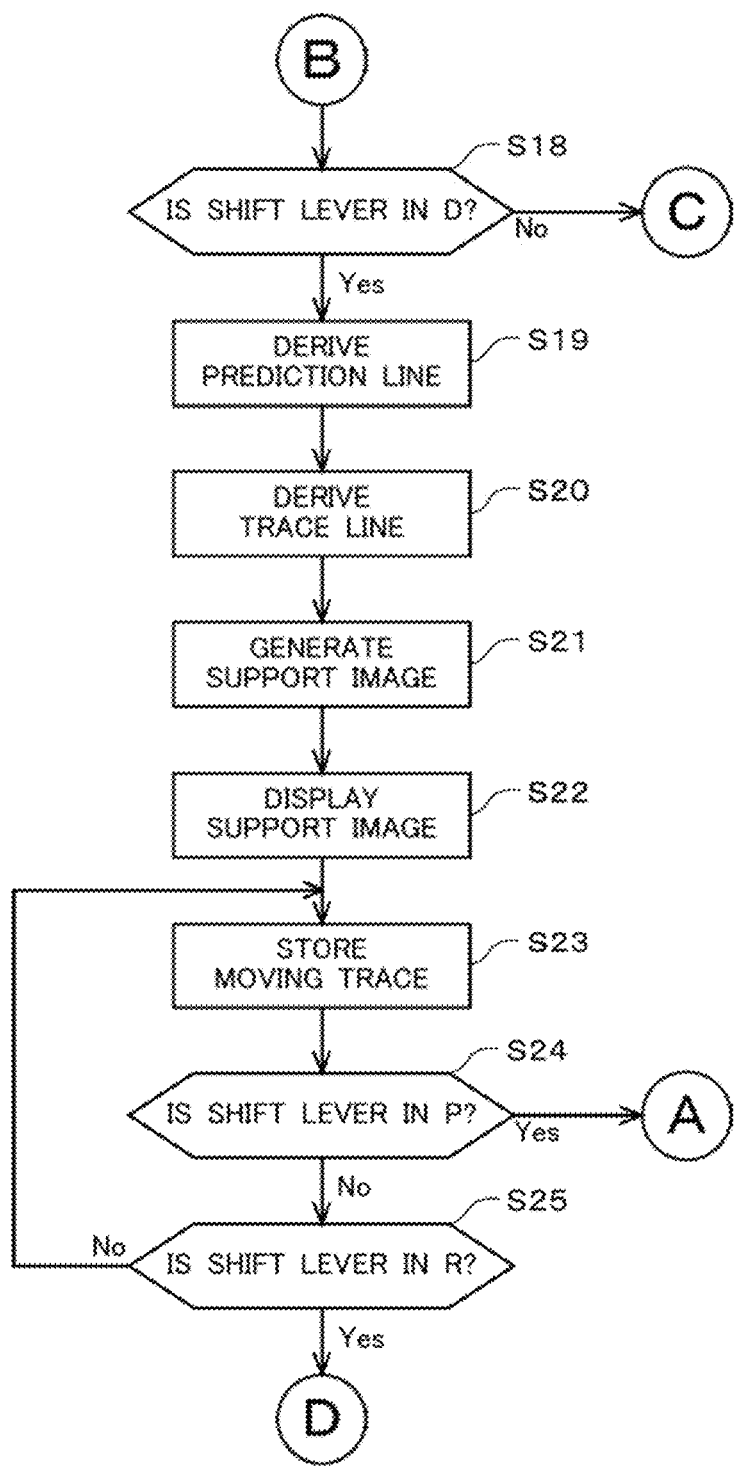
FIG. 8 illustrates a flowchart showing a process of the image display system.
Figure 9:
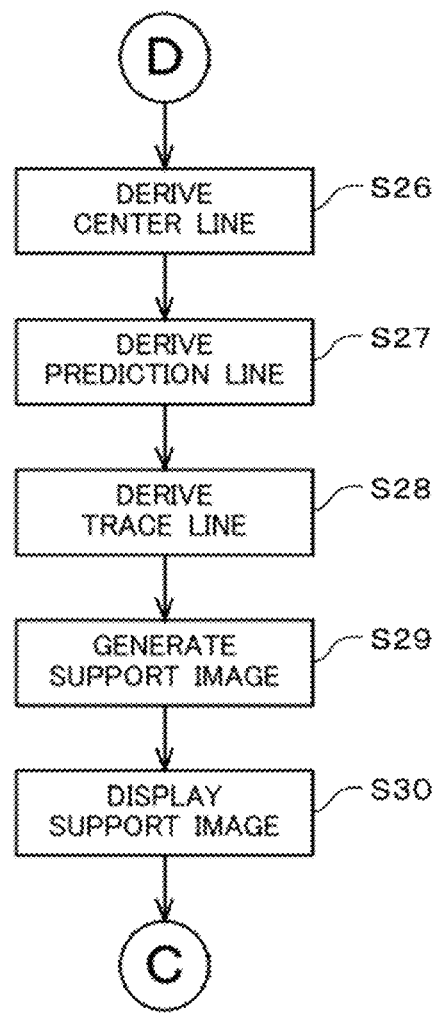
FIG. 9 illustrates a flowchart showing a process of the image display system.

Next explained is a process performed by an image display system 10. FIGS. 7, 8, and 9 illustrate flowcharts showing a flow of the process performed by the image display system 10.

The process performed by the image display system 10 starts by booting up the image display system 10. When the process starts, the image display system 10 determines whether a switch is on or not (a step S10). The determination whether the switch is on or not is necessary in a case where a switch for displaying a support image by a user's manual instruction is equipped. The determination whether the switch is on or not is made based on operation information of the operation button 4 and the like.

When the switch is on (Yes for the step S10), proceed to a display process of a support image. On the other hand, when the switch is not on (No for the step S10), it needs to be determined whether a shift lever is in position reverse (R) or not (a step S11). The determination whether the shift lever is in position R or not is made based on a signal showing the shift position received from a shift sensor 92.

In a case where the shift lever is in position R (Yes for the step S11), there is a possibility of moving a vehicle backward to park. Therefore, proceed to the process of displaying a support image. In other words, when the shift lever is in R, proceed to the process of displaying a support image automatically. On the other hand, in a case where the shift lever is not in R (No for the step S11), the process ends. It is because a display instruction of the support image is given neither manually nor automatically when the switch is not on and the shift lever is not in R.

When the process proceeds to the process of displaying a support image, a center line derivation part 20*a* performs a process of deriving a center line (a step S12). The center line derivation part 20*a* derives an available parking region from a photographic image photographed by a rear camera 5B. In other words, the center line derivation part 20*a* recognizes a white line based on data of the photographic image and derives the available parking region by recognizing available space through object detection such as a cubic object. However, the center line derivation part 20*a* may derive the available parking region using other methods. When the center line derivation part 20*a* derives the available parking region, a center line extending in a parking direction over an approximate center part of the available parking region is derived.

A prediction line derivation part 20*b* performs a process of deriving a prediction line (a step S13). The prediction line derivation part 20*b* derives a rotation direction and rotation angle of the host vehicle 9 based on information acquired from a steering sensor 94 of the host vehicle 9. The prediction line derivation part 20*b* derives a prediction line predicting a moving path of the host vehicle 9 based on the rotation direction and rotation angle of the host vehicle 9.

An information superimposing part 23 generates a support image (a step S14). In other words, the information superimposing part 23 generates the support image by superimposing a center line and a prediction line on a corresponding position of a photographic image photographed by the rear camera 5B. The position of the center line on the photographic image shows the approximate center of the available parking region. The position of the prediction line on the photographic image is the predicted position on which the center of the host vehicle 9 will move.

When the information superimposing part 23 generates a support image, a display apparatus 3 displays the support image (a step S15). In other words, a display controller 20*d* makes an image output part 24 output the support image generated by the information superimposing part 23 to the display apparatus 3. The display apparatus 3 displays the support image input by the image output part 24. In this case, for example, the support image illustrated in FIG. 4 is displayed on the display apparatus 3.

When the host vehicle 9 moves backward to the available parking region (a movement from a position 9*a* to a position 9*b* in FIG. 3), the image display system 10 stores the moving trace (a step S16). In other words, a controller 20 stores positional information acquired from a GPS receiver 91 or a path on which the host vehicle 9 has moved based on information of a photographic image acquired by an image acquisition part 21 in a memory part 25.

The controller 20 determines whether the shift lever is in position parking (P) or not (a step S17). It is determined whether the shift lever is in position P or not based on a signal showing the shift position received from the shift sensor 92.

In a case where the shift lever is in position P (Yes for the step S17), the process ends because the shift lever in position P shows that the host vehicle 9 stops. On the other hand, in a case where the shift lever is not in position P (No for the step S17), the controller 20 determines whether the shift lever is in position drive (D) or not (a step S18). The determination whether the shift lever is in position D or not is made based on a signal showing the shift position received from the shift sensor 92.

In a case where the shift lever is not in position D (No for the step S18), the process is performed repeatedly from a process of storing a moving trace (the step S16) because the host vehicle is moving backward. On the other hand, in a case where the shift lever is in position D (Yes for the step S18), it is determined that the wheel of the host vehicle 9 has turned because the shift lever in position D shows that the shift lever is changed from R to D. When the shift lever is changed between R and D, it is determined that the wheel of the host vehicle 9 has turned. The information superimposing part 23 or the controller 20 may determine whether the wheel of the host vehicle 9 has turned or not.

The image display system 10 performs a process of generating a support image. The process of generating the support image is performed by the derivation of a prediction line derived by the prediction line derivation part 20b (a step S19). In other words, the prediction line derivation part 20b derives the rotation direction and rotation angle of the host vehicle 9 according to information acquired from the steering sensor 94 of the host vehicle 9. The prediction line derivation part 20b derives a prediction line predicting a moving path of the host vehicle 9 based on the rotation direction and rotation angle of the host vehicle 9.

The trace line derivation part 20c performs a process of deriving a trace line (a step S20). In other words, the trace line derivation part 20c reads information of the moving path of the host vehicle 9 before turning the wheel from the memory part 25. The trace line derivation part 20c derives a trace line based on those read information.

The information superimposing part 23 generates a support image (a step S21). In other words, the information superimposing part 23 generates the support image by superimposing a prediction line and a trace line on a corresponding position of a photographic image photographed by the front camera 5F. A position of the prediction line on the photographic image is a predicted position on which the center of the host vehicle 9 will move. A position of the trace line on the photographic image is a position on which the host vehicle 9 has moved before turning the wheel.

When the information superimposing part 23 generates the support image, the display apparatus 3 displays the support image (a step S22). In other words, the display controller 20d makes the image output part 24 output the support image generated by the information superimposing part 23 to the display apparatus 3. The display apparatus 3 displays the support image input by the image output part 24. In this case, for example, the support image illustrated in FIG. 5 is displayed on the display apparatus 3.

When the host vehicle 9 moves forward (a movement from the position 9b to the position 9c in FIG. 3), the image display system 10 stores the moving path (a step S23). In other words, the controller 20 stores the path on which the host vehicle 9 has moved based on positional information acquired from the GPS receiver 91 and information of the photographic image acquired by the image acquisition part 21.

The controller 20 determines whether the shift lever is in position P or not (a step S24). The determination whether the shift lever is in position P or not is also made similarly as described above. In a case where the shift lever is in position P (Yes for the step S24), the process ends because the shift lever in position P shows that the host vehicle 9 stops. On the other hand, in a case where the shift lever is not in position P (No for the step S24), the controller 20 determines whether the shift lever is in position R or not (a step S25). This determination whether the shift lever is in position R or not is made similarly as described above.

In a case where the shift lever is not in position R (No for the step S25), the host vehicle 9 is moving forward. Therefore, the process is performed repeatedly from a process of storing the moving trace (the step S23). On the other hand, in a case where the shift lever is in position R (Yes for the step S25), it is determined that the wheel of the host vehicle 9 has turned because the shift lever in position R shows that the shift lever is changed from D to R. The image display system 10 performs is the process of generating the support image. The information superimposing part 23 or the controller 20 may determine whether the wheel of the host vehicle 9 has turned or not.

The center line derivation part 20a performs a process of deriving a center line (a step S26). In other words, the center line derivation part 20a derives the available parking region based on a photographic image photographed by the rear camera 5B. For derivation of the available parking region, the same method as described above is used. The center line derivation part 20a derives the available parking region and a center line extending in the parking direction over the approximate center part of the available parking region.

The prediction line derivation part 20b performs a process of deriving a prediction line (a step S27). For this derivation of the prediction line, the same method as described above is used.

The trace line derivation part 20c performs a process of deriving a trace line (a step S28). The trace line derivation part 20c reads information of the moving path of the host vehicle 9 before turning the wheel from the memory part 25. The trace line derivation part 20c derives a trace line based on those read information.

The information superimposing part 23 generates a support image (a step S29). In other words, the information superimposing part 23 generates the support image by superimposing a center line, a prediction line, and a trace line on a corresponding position of a photographic image photographed by the rear camera B. A position of the center line on the photographic image is a position showing the approximate center of the available parking region. A position of the prediction line on the photographic image is a predicted position on which a center of the host vehicle 9 will move. A position of the trace line is a position on which the host vehicle 9 has moved before turning the wheel.

When the information superimposing part 23 generates a support image, the display apparatus 3 displays the support image (a step S30). For this display, the same method as described above is used. In this case, for example, the support image illustrated in FIG. 6 is displayed on the display apparatus 3.

When the host vehicle 9 starts to move backward to an available parking region (a movement to the available parking region P from the position 9c in FIG. 3), the image display system 10 repeats the process from the process of storing a moving trace (the step S16).

Thus, the image display system 10 in this embodiment is a system which displays a support image superimposing a trace line before turning the wheel and a prediction line after turning the wheel on a photographic image when the wheel of the host vehicle 9 has turned to park in a parking lot. The image display system 10 also superimposes a center line on the photographic image when the host vehicle 9 moves to the available parking region. The image display system 10 performs these processes repeatedly until the host vehicle 9 stops.

By displaying a trace line and a prediction line, the moving path before and after turning the wheel can be displayed. Therefore, the user can specifically understand the difference of the traveling direction of the host vehicle. The display of the prediction line and the center line enables the user to park in the available parking region easily.

2. Second Embodiment

A second embodiment is described. The first embodiment explains the configuration in which a host vehicle 9 moves backward to park. However, the invention is not limited to the first embodiment. This invention can be applied to a case where the host vehicle 9 moves forward to park. Hence, the second embodiment explains a configuration in which the host vehicle 9 moves forward to park focusing mainly on a point different from the first embodiment.

Figure 10:
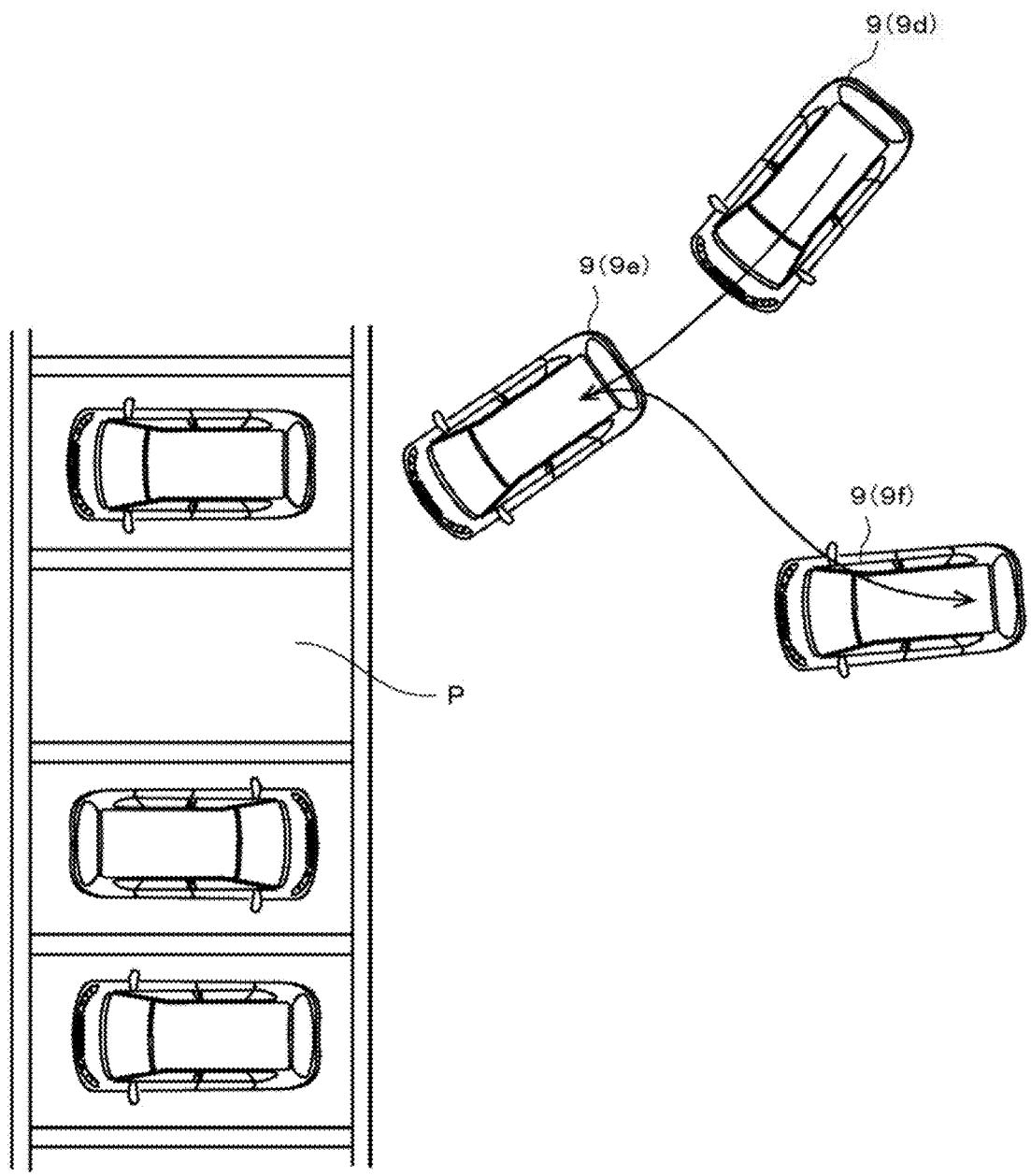
FIG. 10 explains a situation of generating a support image.

FIG. 10 illustrates a situation in which the host vehicle 9 is being parked in an available parking region P. The second embodiment shows an example in which the host vehicle 9 moves forward to park. In other words, this is the example in which the host vehicle 9 moves from a position 9d to a position 9e and then a wheel of the host vehicle 9 is turned so as to move the host vehicle 9 to a position 9f, and further the wheel of the host vehicle 9 is turned to park.

In this example, if the wheel of the host vehicle 9 is turned at the position 9e, from the position 9d to the position 9e is a movement before turning the wheel. From the position 9e to the position 9f is a movement after turning the wheel. In a case where the wheel of the host vehicle 9 is turned at the position 9f, from the position 9e to the position 9f is a movement before turning the wheel. From the position 9f to a next position is a movement after turning the wheel.

<2-1. System Configuration and Process>

A configuration of an image display system in the second embodiment is similar to a configuration of an image display system 10 in the first embodiment explained in FIG. 1. Thus, detailed explanation on each configuration is omitted. A process performed by the image display system 10 in the second embodiment is explained below.

Figure 11:
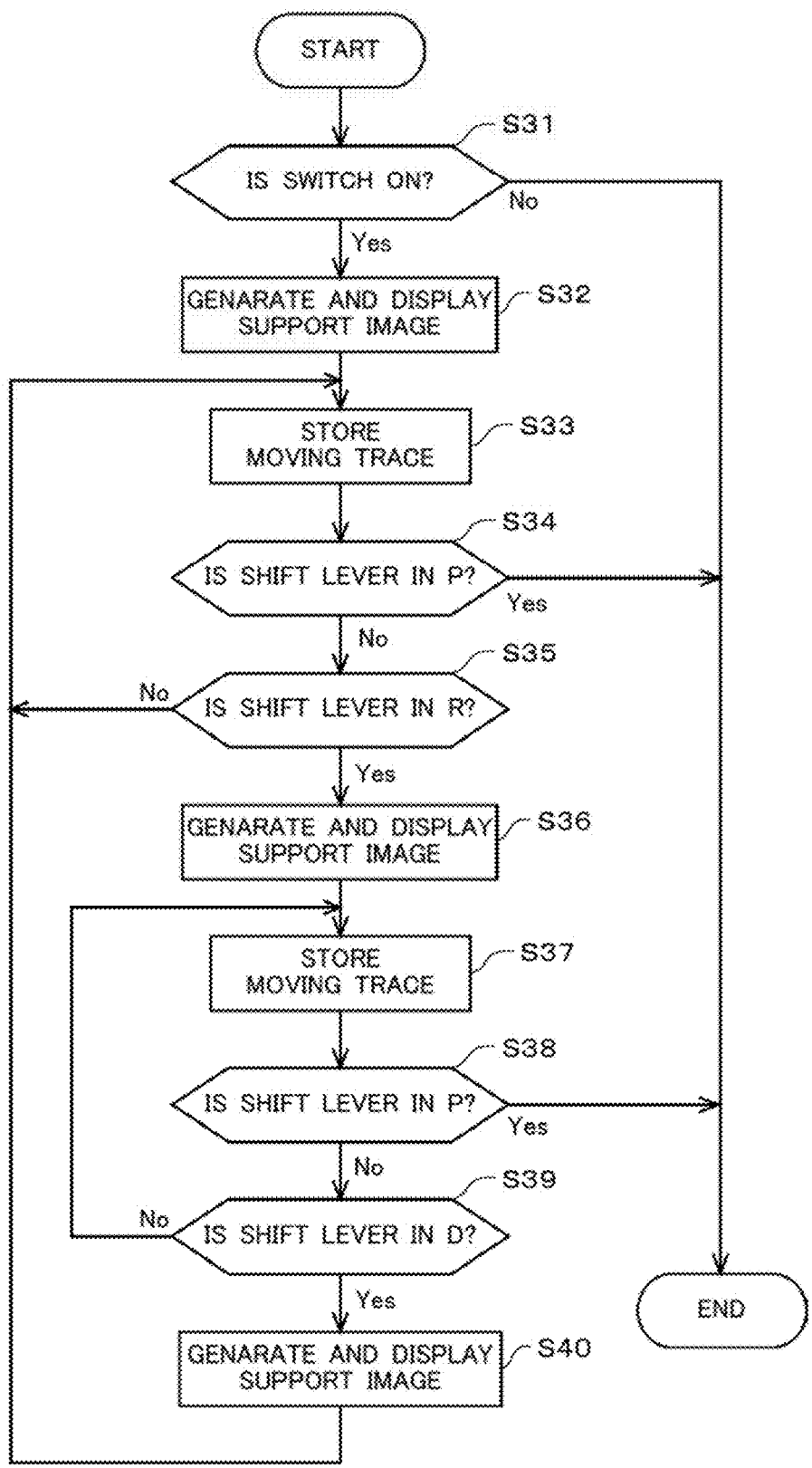
FIG. 11 illustrates a flowchart showing a process of the image display system.

FIG. 11 illustrates a flowchart showing a flow of the process performed by the image display system 10 in the second embodiment. The process illustrated in FIG. 11 is a process corresponding to a forward movement and a backward movement which is mainly changed from a process corresponding to a backward movement and a forward movement in the first embodiment.

The process performed by the image display system 10 starts by booting up the image display system 10. When the process starts, the image display system 10 determines whether a switch is on or not (a step S31). This embodiment has a configuration in which the host vehicle 9 moves forward to park. However, in order to distinguish a forward movement in parking and a normal driving, the process does not automatically proceed to a display process of a support image in a case where a shift lever is in position D, but the process proceeds to the display process of the support image in a case where an instruction is given by a user manually.

Therefore, in a case where the switch is not on (No for the step S31), the process ends. On the other hand, in a case where the switch is on (Yes for the step S31), the process proceeds to a process of generating and displaying the support image (a step S32). This process is same as the steps S12, S13, S14 and S15 explained in the first embodiment. However, in this embodiment, the support image generated by superimposing a center line and a prediction line on a photographic image photographed by a front camera 5F is displayed.

When the host vehicle 9 moves forward to an available parking region (a movement from a position 9d to a position 9e in FIG. 10), the image display system 10 stores the moving trace (a step S33). This process is same as the step S16 mentioned above.

A controller 20 determines whether the shift lever is in position P or not (a step S34). In a case where the shift lever is in position P (Yes for the step S34), the process ends because the shift lever in position P shows that the host vehicle 9 stops. On the other hand, in a case where the shift lever is not in position P (No for the step S34), the controller 20 determines whether the shift lever is in position R or not (a step S35). A determination of a shift position explained in this embodiment is made similarly as described above based on a signal showing the shift position received from a shift sensor 92.

In a case where the shift lever is not in position R (No for the step S35), the process is performed repeatedly from a process of storing a moving trace (the step S33) because the host vehicle 9 is moving forward. On the other hand, in a case where the shift lever is in position R (Yes for the step S35), it is determined that a wheel of the host vehicle 9 has turned because the shift lever in position R shows that the shift lever is changed from D to R. Therefore, the image display system 10 proceeds to a process of generating and displaying a support image (a step S36). This process is same as the steps S19, S20, S21 and S22 mentioned above. However, in this embodiment, a support image generated by superimposing a prediction line and a trace line on a photographic image photographed by the rear camera 5B is displayed. Besides, similarly as mentioned above, the information superimposing part 23 or the controller 20 may determine whether the wheel of the host vehicle 9 has turned or not.

When the host vehicle 9 moves backward (a movement from the position 9e to the position 9f in FIG. 10), the image display system 10 stores the moving path (a step S37). This process is same as the step S23 mentioned above.

The controller 20 determines whether the shift lever is in position P or not (a step S38). In a case where the shift lever is in position P (Yes for the step S38), the process ends because the shift lever in position P shows that the host vehicle 9 stops. On the other hand, in a case where the shift lever is not in position P (No for the step S38), the controller 20 determines whether the shift lever is in position D or not (a step S39). In a case where the shift lever is not in position D (No for the step S39), the process is repeated from the process of storing a moving trace (the step S37) because the host vehicle 9 is moving backward.

On the other hand, in a case where the shift lever is in position D (Yes for the step S39), it is determined that the wheel of the host vehicle 9 has turned because the shift lever in position D shows that the shift lever is changed from R to D. Therefore, the image display system 10 proceeds a process of generating and displaying a support image (a step S40). This process is same as the steps S26, S27, S28, S29 and S30 mentioned above. However, in this embodiment, the support image generated by superimposing a center line, a prediction line, and a trace line on a photographic image photographed by the front camera 5F is displayed.

When the host vehicle 9 moves forward to the available parking region P (a movement to the available parking region P from the position 9*f* in FIG. 10), the image display system 10 repeats the process from a process of storing a moving trace (the step S33).

The image display system 10 in this embodiment displays a support image superimposing a trace line before turning the wheel and a prediction line after turning the wheel on a photographic image in parking the host vehicle 9 in a parking lot with turning the wheel. Displaying the trace line and the prediction line makes it possible to display a moving path before and after turning the wheel. Therefore, a user can specifically understand a difference of the traveling direction of the host vehicle 9. The image display system 10 displays a center line as well when the host vehicle 9 moves toward the available parking region. The display of the prediction line and the center line enables the user to park in the available parking region easily.

3. Modifications

The embodiments of the invention have been described above. However, the invention is not limited to the foregoing embodiments. This invention can be modified variously. Hereinafter, modification examples are described below. Any of forms in the foregoing embodiments and in the modifications below may be combined with another appropriately.

In the first embodiment, an example is explained in which a support image is displayed when a host vehicle moves backward to park. In the second embodiment, an example is explained in which a support image is displayed when the host vehicle moves forward to park. A configuration may be possible in which these examples are combined.

A concrete example of combination is as follows. An image display system is configured to be able to perform any processes in the first and second embodiments. In a case where a switch is on, the image display system determines a shift position and performs a process explained in the first embodiment if a shift lever is in position R. In a case where the shift lever is in position D, the image display system performs a process explained in the second embodiment. Even in a case where the switch is not on, a process of displaying a support image may be performed automatically when the shift lever is in R.

In the foregoing embodiments, support information like a prediction line, etc. is superimposed on a photographic image photographed by a rear camera 5B or a photographic image photographed by a front camera 5F. However, the support information may be superimposed on a composite image generated by an image composite part 22.

For example, in a case where a virtual viewpoint whose position of a viewpoint is directly above the host vehicle 9 and whose gaze direction is directly below is set, the image composite part 22 generates a composite image looking down at the host vehicle 9 and a region near the host vehicle 9. An information superimposing part 23 generates a support image by superimposing support information like a prediction line, etc. on the composite image.

Figure 12:
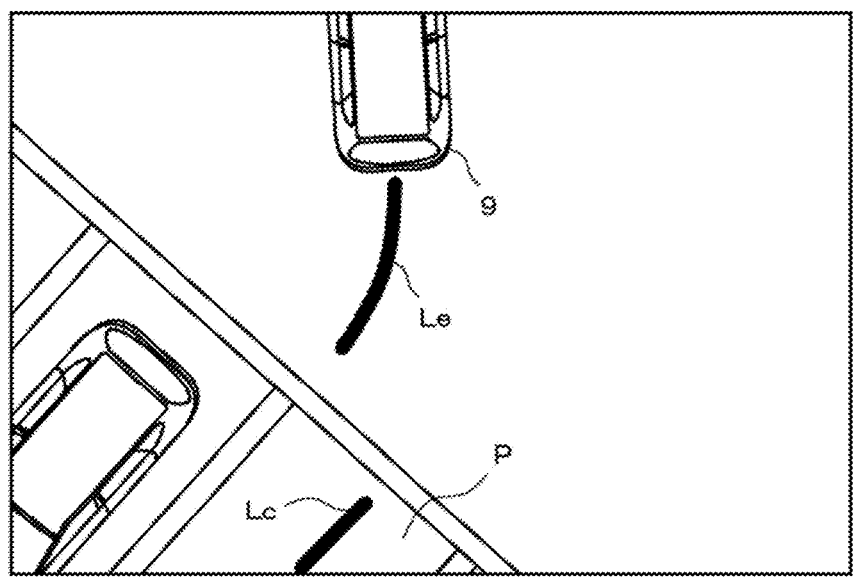
FIG. 12 illustrates an example of support image.

An explanation is given as follows with reference to Figs. In a case where the host vehicle 9 is in a position 9*a* in FIG. 3, a support image illustrated in FIG. 12 is generated by generating a support image by use of a composite image with a virtual viewpoint whose position of a viewpoint is directly above a rear portion of the host vehicle 9 and whose gaze direction is directly below. In other words, the support image is an image superimposing a prediction line Le which predicts a moving path of the host vehicle 9 and a center line Lc which shows an approximate center part of an available parking region P on the composite image viewing the rear portion of the host vehicle from above.

Figure 13:
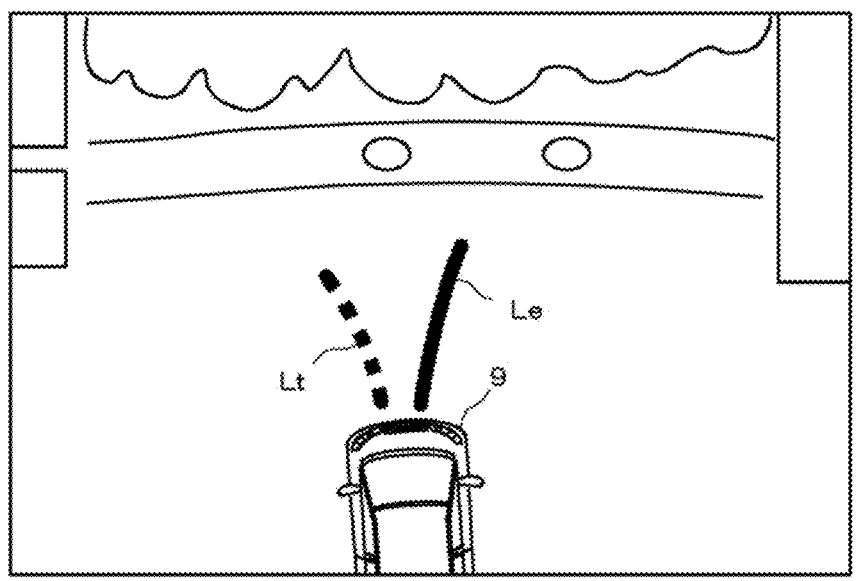
FIG. 13 illustrates an example of support image.

Likewise, in a case where the host vehicle 9 is in a position 9*b* in FIG. 3, a support image illustrated in FIG. 13 is generated by generating a support image by use of a composite image with a virtual viewpoint whose position of a viewpoint is above a front portion of the host vehicle 9 and whose gaze direction is directly below. In other words, the support image is an image superimposing a trace line Lt which shows a moving path before turning the wheel and a prediction line Le which predicts a moving path after turning the wheel on the composite image viewing the front portion of the host vehicle 9 from above.

Figure 14:
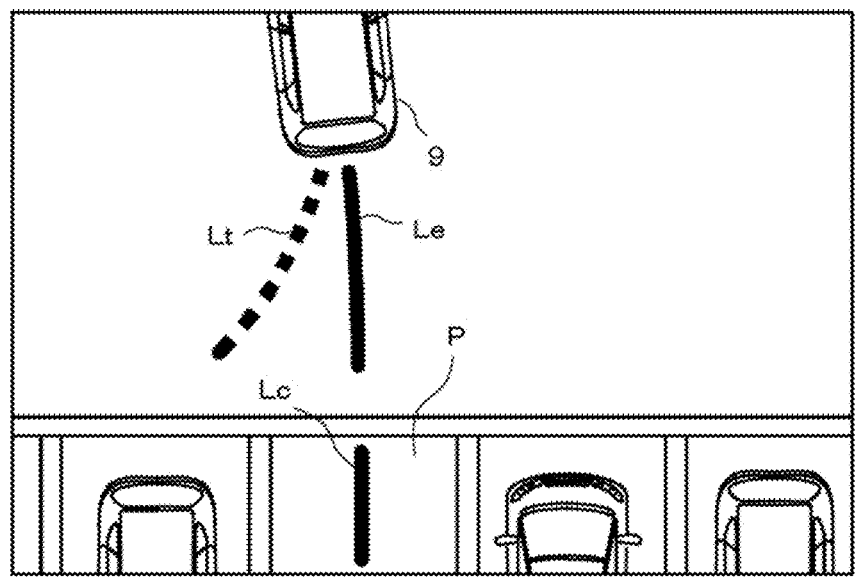
FIG. 14 illustrates an example of support image.

Likewise, in a case where the host vehicle 9 is in a position 9*c* in FIG. 3, for example, a support image illustrated in FIG. 14 is generated by generating a support image is by use of a composite image with a virtual viewpoint whose position of a viewpoint is above the rear portion of the host vehicle 9 and whose gaze direction is directly below. In other words, the support image is an image superimposing a trace line Lt which shows a moving path before turning the wheel, a prediction line Le which predicts a moving path after turning the wheel, and a center line Lc which shows a center part of the available parking region P on the composite image viewing the rear portion of the host vehicle 9 from above.

As described above, by using different kinds of image data (such as a photographic image and a composite image) for generation of a support image and generating plural kinds of composite images whose position of a virtual viewpoint is different from each other, the support image can be generated based on the images viewing the region near the host vehicle 9 from various positions.

A support image generated by use of the photographic images illustrated in FIGS. 4, 5, and 6 and a support image generated by use of the composite images illustrated in FIGS. 12, 13, and 14 may be switched and displayed. In other words, the display is switched by a user selecting a desired display form when a support image is displayed. For example, when the support image illustrated in FIG. 4 is displayed, by operating an operation button 4 or a touch panel, etc., it comes to be possible to switch the display of the support image illustrated in FIG. 4 to the support image illustrated in FIG. 12. This switch may be performed when the process of displaying a support image starts or while the support image is displayed, the switch may be performed in arbitrary timing. The display form may be automatically switched depending on a driving situation, etc. of the host vehicle 9.

Figure 16:
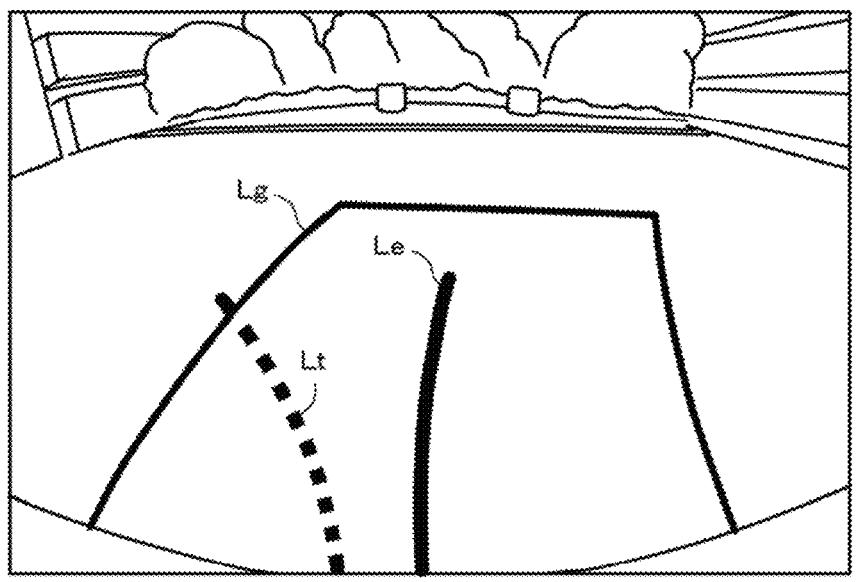
FIG. 16 illustrates an example of support image.
Figure 17:
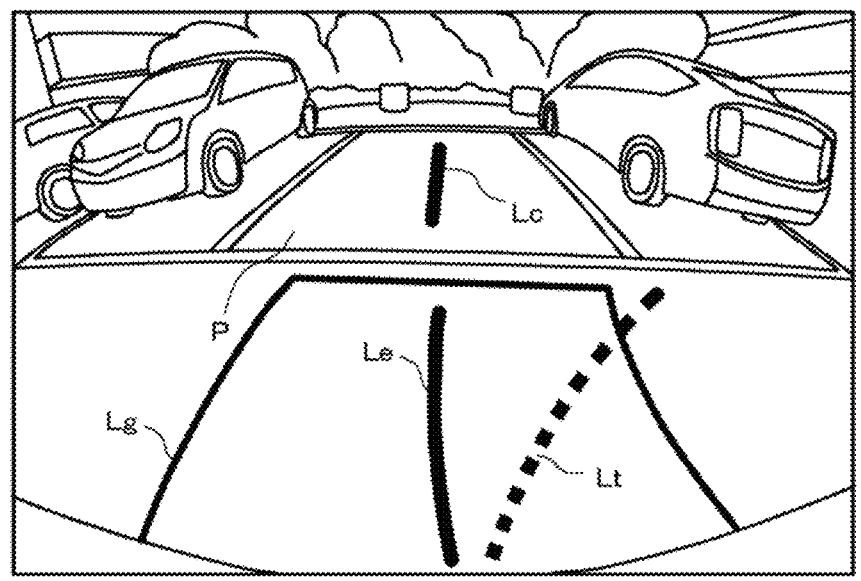
FIG. 17 illustrates an example of support image.

In the foregoing embodiments, a center line, a prediction line, and a trace line are used as support information. In addition to this information, a guiding line showing a width of the host vehicle 9, etc. may be superimposed and displayed. When the guiding line is superimposed on the support images illustrated in FIGS. 4, 5, and 6, the support images illustrated in FIGS. 15, 16, and 17 are generated.

Figure 15:
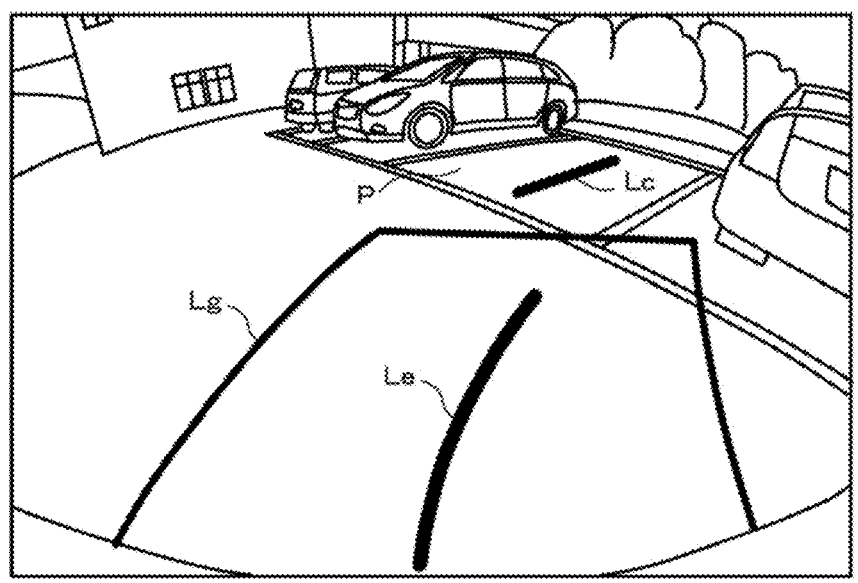
FIG. 15 illustrates an example of support image.

FIG. 15 illustrates an example of a support image superimposing a guiding line Lg on the support image illustrated in FIG. 4. FIGS. 16 and 17 illustrate examples of support images superimposing a guiding line Lg on respective support images illustrated in FIGS. 5 and 6. A user may switch whether to superimpose this guiding line or not. The guiding line can be displayed only if the user wants to display. The guiding line may be superimposed and displayed on a support image by use of the composite images illustrated in FIGS. 12, 13, and 14.

As explained in the foregoing embodiments, this invention stores the moving trace of the host vehicle. By reading and displaying the stored moving trace, it is possible to look back at a driving path of the host vehicle later. For example, if the moving trace is displayed when the host vehicle runs off while driving on a S-shaped bend or a crank road, a cause of the running off can be grasped.

In the foregoing embodiments, it is explained that various functions are implemented as software by a performance of arithmetic processing of a CPU based on programs. However, a part of the functions may be implemented by an electrical hardware circuit. A part of the functions implemented by the hardware circuit may be implemented as software.

While the invention has been shown and described in detail, the foregoing description is in all aspects illustrative and not restrictive. It is therefore understood that numerous other modifications and variations can be devised without departing from the scope of the invention.

What is claimed is:

1. An image processing apparatus that processes an image relating to a host vehicle, the host vehicle being capable of selectively moving in a forward direction of the host vehicle and in a backward direction of the host vehicle, the backward direction being opposite the forward direction, the image processing apparatus comprising:
   an image processor configured to:
      acquire a photographic image from a camera photographing a region near the host vehicle;
      derive a trace line showing a path along which the host vehicle has moved before changing a moving direction of the host vehicle between the forward and backward directions, the trace line being derived from a movement of the host vehicle in one of the forward and backward directions;
      derive a prediction line showing a predicted moving path of the host vehicle after the changing of the moving direction of the host vehicle between the forward and backward directions, the prediction line showing the predicted moving path of the host vehicle in an opposite one of the forward and backward directions from the movement direction of the host vehicle depicted by the trace line;
      generate a support image by superimposing the trace line and the prediction line on the photographic image in response to the moving direction of the host vehicle changing between the forward and backward directions; and
      output the support image to a display apparatus that displays the support image.

2. The image processing apparatus according to claim 1, wherein:
   the image processor is configured to acquire information as to a shift position of the host vehicle, and
   the image processor determines that the moving direction of the host vehicle has changed when the shift position changes between a position showing a forward movement of the host vehicle and a position showing a backward movement of the host vehicle.

3. The image processing apparatus according to claim 1, wherein:
   the image processor is configured to recognize an available parking region where the host vehicle can be parked, and derive a center line showing a center part of the available parking region, and
   the image processor generates the support image by superimposing the trace line, the prediction line, and the center line on the photographic image.

4. The image processing apparatus according to claim 1, wherein
   the photographic image is an image photographed by a camera photographing a rear portion of the host vehicle or a camera photographing a front portion of the host vehicle.

5. The image processing apparatus according to claim 1, wherein:
   the image processor is configured to generate a composite image showing a region near the host vehicle viewed from a virtual viewpoint based on the photographic image, and
   the image processor generates the support image by superimposing the trace line and the prediction line on the composite image in response to the moving direction of the host vehicle changing between the forward and backward directions.

6. The image processing apparatus according to claim 5, wherein:
   the image processor is configured to recognize an available parking region where the host vehicle can be parked, and derive a center line showing a center part of the available parking region, and
   the image processor generates the support image by superimposing the trace line, the prediction line, and the center line on the composite image.

7. The image processing apparatus according to claim 5, wherein
   the image processor outputs the support image generated by use of the photographic image and the support image generated by use of the composite image to the display apparatus alternately.

8. The image processing apparatus according to claim 5, wherein
   the image processor generates the support image by further superimposing a guiding line showing a width of the host vehicle on the photographic image or on the composite image.

9. An image display system comprising:
   the image processing apparatus according to claim 1; and
   a display apparatus that displays an image.

10. The image processing apparatus according to claim 1, wherein:
    the photographic image is one photographic image so that the image processor generates the support image by superimposing the trace line and the prediction line on the one photographic image.

11. An image processing method that processes an image relating to a host vehicle, the host vehicle being capable of selectively moving in a forward direction of the host vehicle and in a backward direction of the host vehicle, the backward direction being opposite the forward direction, the method comprising the steps of:
    (a) acquiring, by an image processor, a photographic image from a camera photographing a region near the host vehicle;
    (b) deriving, by the image processor, a trace line showing a path along which the host vehicle has moved before changing a moving direction of the host vehicle between the forward and backward directions, the trace line being derived from a movement of the host vehicle in one of the forward and backward directions;
    (c) deriving, by the image processor, a prediction line showing a predicted moving path of the host vehicle after the changing of the moving direction of the host vehicle between the forward and backward directions, the prediction line showing the predicted moving path of the host vehicle in an opposite one of the forward and backward directions from the movement direction of the host vehicle depicted by the trace line;

(d) generating, by the image processor, a support image by superimposing the trace line and the prediction line on the photographic image in response to the moving direction of the host vehicle changing between the forward and backward directions; and (e) outputting, by the image processor, the support image to a display apparatus that displays the support image.

\* \* \* \* \*